(12) United States Patent
Cummings

(10) Patent No.: US 6,207,257 B1
(45) Date of Patent: Mar. 27, 2001

(54) PRESSURE SEAL ROLL PRODUCT AND APPARATUS AND METHODS USING THE PRODUCT TO FORM MAILERS

(75) Inventor: Paul M. Cummings, Grand Island, NY (US)

(73) Assignee: Moore Business Forms, Inc., Grand Island, NY (US)

( * ) Notice: Subject to any disclaimer, the term of this patent is extended or adjusted under 35 U.S.C. 154(b) by 0 days.

(21) Appl. No.: 08/290,093

(22) Filed: Aug. 15, 1994

Related U.S. Application Data

(63) Continuation of application No. 08/006,848, filed on Jan. 21, 1993, now abandoned.

(51) Int. Cl.[7] ................................. C09J 7/02; B32B 7/12
(52) U.S. Cl. ........................... 428/195; 428/43; 428/343; 428/537.5; 428/906
(58) Field of Search .................................... 428/195, 198, 428/343, 537.5, 906, 40, 43

(56) References Cited

U.S. PATENT DOCUMENTS

| | | | |
|---|---|---|---|
| 2,115,392 | 4/1938 | Mabon | 282/12 |
| 3,552,282 | * 1/1971 | Wilson | 93/61 |
| 3,602,114 | 8/1971 | Peters | 93/61 |
| 4,091,987 | 5/1978 | Cone | 229/69 |
| 4,376,151 | 3/1983 | Parrotta | 428/323 |
| 4,901,663 | * 2/1990 | De Luca | 428/906 X |
| 4,918,128 | * 4/1990 | Sakai | 524/450 |
| 4,980,212 | 12/1990 | Marquis et al. | 428/40 |
| 5,049,117 | 9/1991 | Mueller . | |
| 5,186,988 | * 2/1993 | Dixon | 428/906 X |
| 5,221,567 | * 6/1993 | Baker | 428/43 |
| 5,275,868 | * 1/1994 | Popat et al. | 428/906 X |

* cited by examiner

*Primary Examiner*—Daniel Zirker
(74) *Attorney, Agent, or Firm*—Nixon & Vanderhye PC

(57) ABSTRACT

The pressure seal product includes a roll of paper having a pressure-sensitive adhesive applied in a predetermined pattern to one or both faces of the paper web for forming mailers. The paper is rewound onto a roll with a tension and weight such that insufficient pressure is exerted for activating the pressure sensitive adhesive. The roll of paper with the pressure sensitive adhesive applied is fed into a printer for printing information on the paper web. The web is then passed through a cutter and a folder for folding the cut sheets into a mailer. The mailers are passed through a pressure sealer for applying pressure to the areas of the mailer containing the pressure-sensitive adhesive to activate the adhesive and secure the mailer.

8 Claims, 2 Drawing Sheets

PRESSURE SEAL ROLL PRODUCT AND APPARATUS AND METHODS USING THE PRODUCT TO FORM MAILERS

This is a continuation of application Ser. No. 08/006,848, filed Jan. 21, 1993, now abandoned.

TECHNICAL FIELD

The present invention relates to a roll product comprised of a paper web for inputting a printer and particularly relates to a paper roll product having pressure sensitive adhesive applied in a predetermined pattern to one or both sides of the paper web whereby the paper web is fed to a printer and subsequently formed into a mailer. The present invention also relates to apparatus and methods using a pressure seal paper roll product input to the printer for forming mailers.

BACKGROUND

Traditionally, continuous self-mailers are formed by providing multiple cartons of fanfolded continuous paper web to a printer with the paper web being subsequently cut, folded and sealed to form the mailers. This requires frequent changes and vigilance due to the limited supply of the product, i.e., frequent handling and splicing of the paper of the various cartons are required to form the substantially continuous self-mailers. Typically, the fanfolded product is provided a printer where individualized or standard information, or both, is printed on the fanfolded product for subsequent formation into the desired mail product, for example, an envelope. An example of a typical product of this type and method of manufacture is described and illustrated in U.S. Pat. No. 3,552,282. In that patent, plain paper is provided from a roll through a forms press to form the fanfolded form prior to the form being input to the printer. Roll infeed equipment, however, has been developed for standard printers enabling the direct loading of printers with the paper web from large-diameter rolls for forming tens of thousands of mailers. By using roll product, handling and splicing are substantially reduced and a "hands-off" operation of the printer for extended periods of time may be provided. Thus, longer print runs, less stops for reloading cartons, less labor costs, less waste of paper and cartons are achieved by using roll infeed equipment for the printer. Various types of adhesive may be applied to the paper to form the mailer. This is conventionally accomplished on-line and downstream of the printer, typically a laser printer, during the manufacture of the mailers. The present invention, therefore, takes advantage of existing laser printer roll feed equipment, allowing self-mailers to be manufactured at the same efficiencies as standard products, but without the problems associated with applying adhesive in a laser printer environment or applying it subsequent to the printer.

DISCLOSURE OF THE INVENTION

In accordance with the present invention, there is provided a paper roll pressure seal product for forming mailers wherein pressure-sensitive adhesive is applied to at least one side of the paper web in a predetermined pattern for forming a multi-ply mailer whereby the paper web with the pressure sensitive adhesive applied thereto can be supplied from a roll directly to a printer, e.g., a laser printer. The predetermined pattern may be applied to one or both sides of the paper web, depending upon the nature of the mailer being manufactured, e.g., C-fold, Z-fold or V-fold mailers. Particularly, the pressure-sensitive adhesive is applied to the paper web by an adhesive coater. Thereafter, the paper web is wound onto a roll under a predetermined tension to form the multiple plies thereof, the magnitude of the applied tension and the weight of the roll being sufficient to avoid adhesion of the pressure-sensitive adhesive of one roll ply to an adjacent roll ply. Consequently, blocking, i.e., the tendency for the product to stick to itself and tear the paper during unwinding, is avoided i.e., the pressure-sensitive adhesive is non-tacky. It has also been found that the pressure-sensitive adhesive, after passing through the printer, remains reliable and that the printer is not contaminated by the adhesive as the paper passes through the printer.

In another aspect of the present invention, there is provided a method for forming mailers from roll paper stock. Particularly, using plain paper stock, a pressure sensitive adhesive is applied to at least one side of a paper web in a pattern necessary to form the desired mailer product. Once the pressure-sensitive adhesive has been applied, the paper web is wound to form the roll product, with the pressure-sensitive adhesive in juxtaposed plies of the roll. Preferably, the winding of the paper web with the pressure-sensitive adhesive applied thereto, is accomplished using increasingly reduced tension on the roll as the roll increases in diameter to ensure a pressure between the plies insufficient to activate the adhesive and cause adhesion between adjacent plies. The paper web is then unwound from the roll and fed through a printer which prints standard or individualized information, or both, on the paper web. To complete the mailer, the forms are detached from the paper web exiting the printer and folded to produce mailers of two or more plies. Thereafter, the folded mailers are passed through a pressure sealer to seal the plies of each mailer to one another about the perimeter of the mailer.

In a further aspect of the present invention, the system for forming the mailers of the present invention includes a roll formed of a paper web wound to form multiple plies with a pressure-sensitive adhesive applied to at least one side of the paper web in a predetermined pattern for forming a multi-ply mailer. The system also includes a printer, preferably a laser printer, for receiving the paper web and printing information on the paper web, and a detacher for separating the paper web into a plurality of sheets and folding the sheets to form a plurality of mailers. The folded mailers are then passed through a pressure sealer for activating the pressure-sensitive adhesive and sealing the edges of the forms to form the completed mailer product.

Accordingly, in a preferred embodiment according to the present invention, there is provided a roll pressure seal product for forming mailers comprising a roll formed of a paper web wound to form multiple plies, a pressure-sensitive adhesive applied to portions of at least one face of the paper web and arranged in a predetermined pattern for forming a multi-ply mailer, the roll being wound under a predetermined tension and having a weight sufficient to avoid adhesion of the pressure-sensitive adhesive between adjacent roll plies at the face portions.

In a further preferred embodiment according to the present invention, there is provided a method of forming mailers from paper stock comprising the steps of applying a pressure seal adhesive to portions of at least one face of a paper web, winding the paper web into a roll with multiple plies and the pressure sensitive adhesive between. adjoining plies, feeding the paper web from the roll through a printer, printing information on the paper web passing through the printer, detaching sheets from the printed paper web exiting the printer, folding the sheets to produce mailers of two or more plies and passing the mailers through a pressure sealer to activate the adhesive to seal the plies of each mailer to one another.

In a still further preferred embodiment of the present invention, there is provided a system for manufacturing mailers comprising a roll formed of a paper web wound to form multiple plies, a pressure-sensitive adhesive applied to portions of at least one face of the paper web arranged in a predetermined pattern for forming a multi-ply mailer, a printer for receiving the paper web from the roll and printing information on the paper web, means for separating the paper web into a plurality of forms and folding the forms to form a plurality of mailers and a pressure sealer for activating the pressure-sensitive adhesive for sealing the forms when folded to form the mailers.

Accordingly, it is a primary object of the present invention to provide a novel and improved roll pressure seal paper product for use as the infeed for printers to form mailers, as well as novel and improved methods and systems for forming mailers using the roll pressure seal product.

BEST MODE FOR CARRYING OUT THE INVENTION

Reference will now be made in detail to a present preferred embodiment of the invention, an example of which is illustrated in the accompanying drawings.

Figure 1:
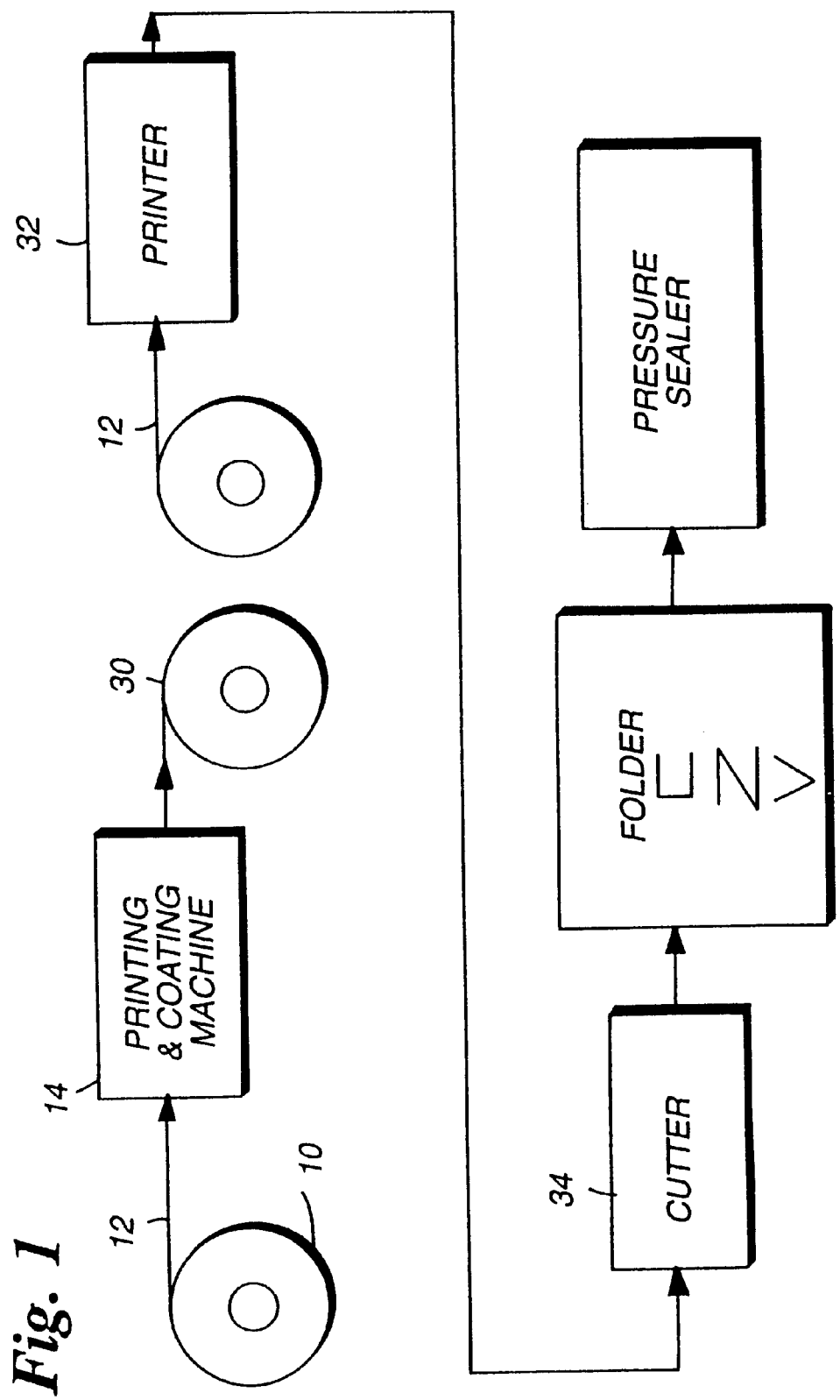
FIG. 1 is a schematic illustration of a system and method for forming mailers using a roll pressure seal product according to the present invention.

Referring now to the drawings, particularly to FIG. 1, the present invention is illustrated in schematic form and includes a roll 10 comprising a wound, substantially continuous, plain paper web 12. Paper web 12 is passed through a pressure-sensitive adhesive applying or coating machine 14 for applying repeat predetermined patterns of pressure-sensitive adhesive to one or both faces of the plain paper web for forming predetermined types of mailers. For example, to form a V-fold mailer, pressure-sensitive adhesive is applied to only one side of the plain paper web in a pattern as necessary to seal the perimeter of a V-form mailer. To form C-fold and Z-fold mailers, the pressure sensitive adhesive is applied to both sides of the form in repeating patterns so that the Z-form and C-form mailers can be sealed in final assembly. Thus, the coating machine 14 applies the pressure-sensitive adhesive in predetermined repeated patterns both longitudinally and transversely of the plain paper web, as necessary, to enable formation of the desired mailer.

Figure 2:
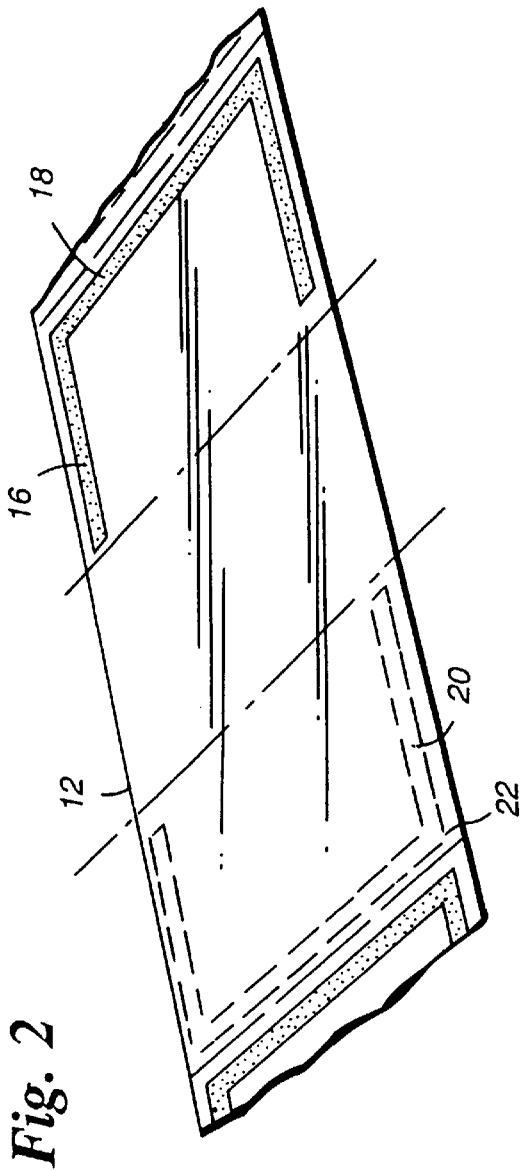
FIG. 2 is a fragmentary perspective view of one face of the paper web of the roll product with pressure sensitive adhesive applied to both sides of the web to form a Z-fold mailer.
Figure 3:
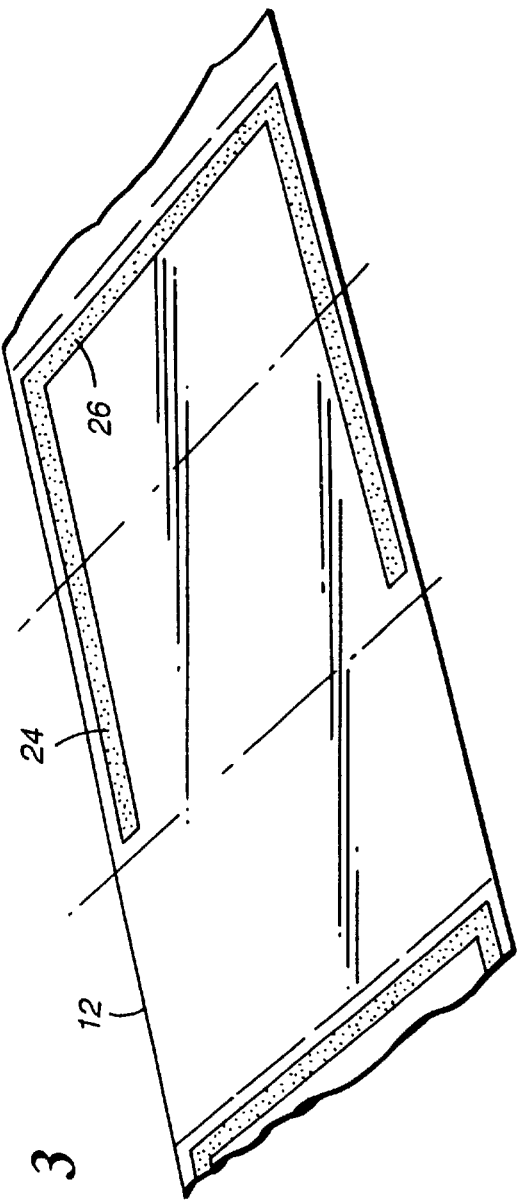
FIG. 3 is a view similar to FIG. 2 illustrating a pressure sensitive adhesive for forming a C-fold.

For example, and referring to FIG. 2, there is illustrated in schematic form a portion of the paper web 12 from which a Z-form mailer may be made. Thus, coating machine 14 applies pressure-sensitive adhesive in strips 16 and 18 along one face of the plain paper along its opposite margins and adjacent one end, respectively. Similarly, adhesive strips 20 and 22 are applied along the opposite face of the paper web and along its opposite margins and adjacent the opposite end, respectively. It will be appreciated that when the form illustrated in FIG. 2 is reversely folded about the dot-dash lines signifying the fold lines into a Z-configuration with the righthand portion folded over the central portion and the lefthand portion folded under the central portion and pressure is applied to the pressure-sensitive adhesive, a Z-form mailer is formed with the perimeter or margins of the mailer completely sealed by the adhesive strips 16, 18, 20 and 22. Similarly, in FIG. 3, there is illustrated a predetermined pattern for forming a typical C-fold mailer. For example, pressure-sensitive adhesive is applied in strips 24 and 26 along one face of the paper web along opposite margins and adjacent one end, respectively. Thus, when the sheet is folded about the dot-dash lines signifying the fold lines, into a C configuration with the lefthand portion folded over the intermediate portion and the righthand portion over the folded central portion and pressure is applied to the pressure-sensitive adhesive, a C-fold mailer is formed with the mailer completely sealed by adhesive 24 and 26 about its margin.

It will be appreciated that the adhesive can be applied in either a "portrait" or "landscape" position relative to the direction of movement of the web.

Referring back to FIG. 1, the paper web with the pressure-sensitive adhesive applied to one or both sides thereof by the coating medium 14 is rewound to form roll product 30. When rewinding, the tension on the paper web is monitored and controlled to a minimum required to form an acceptable roll defined by a lack of axial telescoping, insufficient flattening of the roll under its own weight when lying in a vertical plane and under a predetermined tension sufficient to avoid adhesion of the pressure-sensitive adhesive from one roll ply to the next. For example, where the activation pressure of the adhesive is 180–200 pounds per lineal inch, the tension and weight of the roll are controlled to achieve a pressure in the roll less than such activation pressure whereby the roll may be unwound without the paper product sticking to itself or tearing. Preferably, the winding tension is reduced as the roll increases in diameter to ensure a pressure between the plies insufficient to cause adhesion of the pressure-sensitive adhesive between adjacent roll plies. The tension range for wrapping the roll with the adhesive applied is between 1.5 to 3.0 lbs/lineal inch with typically about 3.0 lbs. tension applied initially and gradually reduced to about 1.5 lbs. Once rewound, the roll may be stored and subsequently used.

The size of the rolls typically may be in the range of between 30–50 inches in diameter with a 40-inch diameter being the most common. The rolls are provided on 5–6 inch diameter cores.

To use the roll, the paper web 12 with the pre-applied pressure-sensitive adhesive on one or both sides is passed through a printer 32, for example, a laser printer. The paper roll is thus fed into the printer, where information, for example, computer-generated or standard information, or both, is printed on the paper web which will ultimately be cut to form the mailers. The preprinted paper web with pressure-sensitive adhesive applied is then fed to a cutter 34 wherein discrete sheets are separated from the paper web for folding into the mailers. The sheets are fed, either manually or automatically, into a folding machine where the sheets are folded about one or more fold axes to form the various mailers, for example, the illustrated V-form, Z-form or C-form mailers. Once folded, the mailers are passed through a pressure sealer which applies pressure to the mailers in the areas corresponding to the location of the pressure-sensitive adhesive. Consequently, when the pressure sealer applies pressure in excess of the activation pressure, for example, 180–200 lbs. per linear inch, the pressure-sensitive adhesive is activated to seal the perimeter of the mailer. It will, of course, be appreciated that different types of mailers can be formed than those specifically disclosed herein.

The pressure-sensitive adhesive may be of the type denoted TN-124, which is a product of the Toppan Moore Company, Ltd., and described and illustrated in U.S. Pat. No. 4,918,128. Other pressure-sensitive adhesives known to the art may also be used.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A roll pressure seal product for forming mailers comprising:
    a roll formed of a paper web wound to form multiple plies;
    a pressure-sensitive adhesive applied to portions of at least one face of said paper web and arranged in a predetermined pattern for forming multi-ply mailers, said roll being wound under a predetermined web tension between about 1.5 to 3.0 lbs/lineal inch and having a weight sufficient to avoid adhesion of the pressure-sensitive adhesive between adjacent roll plies at said face portions.

2. A roll pressure seal product according to claim 1 wherein said roll is 30–50 inches in diameter, with a roll core diameter no greater than 6 inches.

3. A roll pressure seal product according to claim 1 wherein said pressure-sensitive adhesive has an activation pressure between 180–200 lbs/lineal inch, said roll being 30–50 inches in diameter, with a roll core diameter no greater than 6 inches.

4. A roll pressure seal product according to claim 1 wherein said adhesive on said paper web in said roll is non-tacky.

5. A roll pressure seal product according to claim 3 wherein said adhesive on said paper web in said roll is non-tacky.

6. A roll pressure seal product according to claim 1 wherein portions of said paper web wound at a first diameter of said roll have a web tension in said roll greater than the web tension of portions of said paper web wound in said roll at a second diameter of said roll greater than said first diameter.

7. A roll pressure seal product according to claim 6 wherein the web tension at the first diameter is about 3.0 pounds and the web tension at the second diameter is about 1.5 pounds.

8. A roll pressure seal product according to claim 6 wherein said roll is 30–50 inches in diameter with a roll core diameter no greater than 6 inches.

* * * * *